United States Patent [19]

Colbers et al.

[11] 4,077,973

[45] Mar. 7, 1978

[54] SYNTHESIS OF METAL PHTHALOCYANINES

[75] Inventors: Gerardus Johannes Baptist Colbers; Johan Jozef Einerhand; Leonardus Johannes Hubertus Erkens; Hubertus Bartholomeus Nicola, all of Maastricht; Jacobus Michiel Hubertus Snijders, Thorn, all of Netherlands

[73] Assignee: Hercules Incorporated, Wilmington, Del.

[21] Appl. No.: 674,341

[22] Filed: Apr. 7, 1976

[30] Foreign Application Priority Data

May 1, 1975 Netherlands ..................... 7505150

[51] Int. Cl.$^2$ ............................................. C09B 47/08
[52] U.S. Cl. .................................................. 260/314.5
[58] Field of Search ..................................... 260/314.5

[56] References Cited

U.S. PATENT DOCUMENTS

| 2,723,980 | 11/1955 | Tarantino et al. ................ 260/314.5 |
| 3,087,935 | 4/1963 | Razavi et al. ..................... 260/314.5 |

FOREIGN PATENT DOCUMENTS 1,290,922   9/1972   United Kingdom ............. 260/314.5

*Primary Examiner*—Richard L. Raymond
*Attorney, Agent, or Firm*—Hazel L. Deming

[57] ABSTRACT

Metal phthalocyanines having a narrow particle size distribution are synthesized via the phthalodinitrile or phthalic anhydride-urea route using hexachlorobutadiene as the diluent. Higher yields and shorter reaction times are also realized by carrying out the syntheses in this manner.

9 Claims, No Drawings

SYNTHESIS OF METAL PHTHALOCYANINES

The metal phthalocyanines are a well-known class of compounds which, in finely divided form, find wide acceptance as pigments. Metal phthalocyanines are usually synthesized by either one of two routes. In one route, a phthalodinitrile is reacted with a metal donor, usually a metal salt, in a melt system without any diluent or in suspension in an inert, high boiling organic diluent. In the other route, which also can be carried out in a melt system or in suspension in an inert organic diluent, a phthalic anhydride is reacted with urea and a metal donor, usually in the presence of a catalyst. The diluent in suspension systems functions as a heat transfer medium and does not affect the course of the reaction. Typical diluents which have been suggested for use in metal phthalocyanine syntheses include kerosene, nitrobenzene, trichlorobenzene and the like as well as mixtures thereof with a minor amount of a lower boiling diluent such as monochlorobenzene, pyridine, diethyl ketone, carbontetrachloride, acetylene tetrachloride, N-methyl morpholine, and the like.

The products which result from either synthesis route are crude crystalline products which require substantial particle size reduction before acceptable pigmentary properties are obtained. One well-known method for reducing the particle size is the acid pasting technique which involves dissolving the crude in relatively large amounts of sulfuric acid and then reprecipitating the phthalocyanine by rapid dilution with water. A modification of the acid pasting technique is known as acid swelling and uses an adjusted amount and concentration of the acid so that actual dissolution does not occur. Although the above acid treatments give pigments of good color strength, the special techniques required for handling and disposing of waste acid make the treatment economically unattractive, particularly in light of modern day quality standards and environmental controls.

Another well-known method for reducing the particle size involves grinding the crude phthalocyanines for extended periods of time with inorganic grinding aids such as steel or ceramic balls, water-soluble salts such as sodium chloride or the like, preferably in the presence of a crystallizing liquid. A modification of this method is described by Tarantino et al. in U.S. Pat. No. 2,723,980 (Nov. 15, 1955) and concerns grinding the metal phthalocyanine in the presence of the liquid diluent in which it was synthesized, the solid grinding aid being added during or following the synthesis reaction. As regards suitable diluents, Tarantino et al. suggest using any of the well-known aromatic crystallizing liquids such as xylene, toluene, nitrobenzene and trichlorobenzene if a green shade pigment of high tinctorial stability in aromatic vehicles is desired or a variety of non-crystallizing liquids such as the cycloaliphatic hydrocarbons or lower aliphatic compounds such as diethylene glycol if a strong bright reddish blue closely approximating the shade of the conventionally prepared acid pasted pigments is desired. Crudes synthesized in the presence of aromatic liquid diluents, however, are in the beta modification (green shade) and cannot be transformed into the alpha modification (red shade) by grinding techniques except with great difficulty. Thus, acid treatment is the preferred technique for converting crude beta into the alpha modification.

Now, in accordance with the present invention, it has been found that significant processing and product advantages can be realized by conducting the synthesis of metal phthalocyanines in the presence of hexachlorobutadiene as the reaction diluent. More specifically, the practice of this invention provides higher yields of crude in shorter periods of time and results in a crude reaction product in a particulate form wherein the particle size distribution range is much narrower than heretofore realized in suspension systems. Additionally, due at least in part to the improved form of the particles, pigmentation of the crude to any desired crystal modification can be readily accomplished by conventional grinding techniques. Hence the invention offers outstanding advantages in the processing of crude into the alpha modification inasmuch as aftertreatment with sulfuric acid is not necessary and the problems associated therewith are eliminated.

Accordingly, the present invention relates to an improved process for the synthesis of metal phthalocyanines via the phthalodinitrile or phthalic anhydride-urea routes in the presence of an organic diluent wherein the improvement comprises using hexachlorobutadiene as the organic diluent.

The metal phthalocyanines which can be synthesized in accordance with this invention are the unsubstituted or substituted copper phthalocyanines as well as the corresponding phthalocyanines of nickel, cobalt, zinc, iron and the like. Thus by the choice of the metal donor which is usually a metal-yielding salt such as the halide or sulfate and preferably a chloride of copper, nickel, zinc and the like and the particular phthalodinitrile- or phthalic anhydride-containing component used in the synthesis, a variety of metal phthalocyanines can be obtained. For example, phthalocyanine molecules containing one or more substituents such as halogen, sulfonic acid and like groups which improve the crystallization and flocculation resistance of the resulting pigments can be formed by using as the phthalodinitrile or phthalic anhydride component a partially or fully substituted component, mixtures of such components with each other or an unsubstituted component, or mixtures of unsubstituted components with other substituted reactants such as the chloro- or sulfophthalic acids or their salts.

The synthesis of metal phthalocyanines and particularly the copper phthalocyanines via the phthalodinitrile and phthalic anhydride-urea routes are well known to the art. The reactions can be carried out as low as 150° C. but it is generally preferred to perform the reaction at about 170° to 200° C. in order to achieve satisfactory yields. The presence of a catalyst is optional in phthalodinitrile syntheses but is usually preferred in the phthalic anhydride-urea synthesis to assure maximum conversion. Typical of the known catalysts for phthalocyanine syntheses is ammonium molybdate.

As indicated above, the synthesis of metal phthalocyanines is carried out in the presence of hexachlorobutadiene. Hexachlorobutadiene meets all the basic requirements of a synthesis diluent in that its boiling point is above the maximum reaction temperature of about 200° C., it is stable and inert under reaction conditions, it is noncombustible, easy to remove and essentially nonpoisonous. The amount of hexachlorobutadiene diluent employed is not critical and can vary within large limits. Generally sufficient hexachlorobutadiene will be present to provide a suspension which can be agitated easily. Large amounts are not detrimental but for reasons of economy are usually not recommended. The use of hexachlorobutadiene as the synthesis diluent has been found to provide yields of at least 90% in about one half the time required for syntheses in trichlorobenzene and additionally to provide a crude having a much narrower particle size distribution range than heretofore realized and particularly to provide a particle size distribution ranging from about 0.3 to about 6 microns.

The reaction products obtained by carrying out the synthesis of metal phthalocyanines in accordance with this invention are recovered conventionally by removing the diluent and impurities and drying usually under vacuum. If desired, the crude can be demetallized at this stage to give a metal-free phthalocyanine, or can be directly halogenated, as, for example, in an eutectic mixture of aluminum chloride and sodium chloride or in hexachlorobutadiene in the presence of catalyst such as ferric chloride, aluminum chloride, antimony trichloride, cupric chloride and the like to give a phthalocyanine molecule containing 14 to 16 halogen atoms. The crude can be worked up into a pigment using any of the conventional techniques for particle size reduction but is particularly adapted to the wet or dry grinding procedures. Thus, pigmentation can be carried out by ball or salt milling in the presence or absence of water or another liquid known to provide a desired crystal form. Outstanding in this respect is the finding that beta crude can be ground directly to the alpha modification by wet milling in the presence of a suitable diluent, a result which is extremely difficult to realize with crude synthesized in the presence of trichlorobenzene as diluent.

Having described the invention generally, the following examples are given to illustrate specific embodiments thereof. All parts and percentages are by weight unless otherwise indicated.

EXAMPLE 1

A mixture of 150 parts of phthalic anhydride, 240 parts of urea, 28 parts of cupric oxychloride, 1.3 parts of ammonium molybdate and 300 parts of hexachlorobutadiene was heated slowly with agitation to 190° C., at which temperature the reaction was completed. Agitation was continued at 190° C. for a total reaction time of 5-6 hours and the resulting melt was dried under vacuum for 4 hours. The dried product was 216 parts (99.0% yield) of crude beta copper phthalocyanine having a purity of 67%. 100 Parts of this crude was purified by boiling with 500 parts of 5% aqueous hydrochloric acid, yielding 70 parts of purified crude containing 96% of beta copper phthalocyanine having a particle size distribution ranging from 0.3 to 6 microns.

The purified crude in an amount equal to 12 parts was then transferred to a 600 ml. milling beaker half filled with 1–3 mm. steel shot and ground with 1.6 parts of sodium dodecyl sulfate, 0.35 part of sodium hydroxide and 3.3 parts of aniline in 120 parts of water on a roller bank at a velocity of 82 rotations/minute at 70° C. After 60 hours of grinding time, the milled suspension was heated to the boil with 500 parts of 15% aqueous sulfuric acid, filtered and washed with water until neutral. The resulting pigment was a very strong copper phthalocyanine pigment in the beta modification and possessed excellent pigmentary properties.

When a second portion of the purified crude in an amount equal to 12 parts was ground and recovered as above except that the grinding medium contained 3 parts of ethoxyethanol and 0.3 part of sodium dichromate as a substitute for the 3.3 parts of aniline and the grinding temperature was 75° C., the resulting product was a red shade alpha copper phthalocyanine pigment having excellent color strength and brilliance.

For the sake of comparison the procedure of this example was repeated except that 600 parts of trichlorobenzene were substituted for the 300 parts of hexachlorobutadiene, 27 parts of cupric oxychloride were used, the reaction mixture was heated slowly to 200° C. and stirred at 200° C. until completed, the total reaction time being 10–12 hours and, following removal of the trichlorobenzene, the product was dried under vacuum for 10–12 hours. The dried product was 180 parts of copper phthalocyanine (91% yield) which gave 78 parts of purified crude containing 94% of beta phase copper phthalocyanine having a particle size distribution ranging from 0.3 to 50 microns. When two separate portions of the purified crude from the comparison example were ground and recovered using the procedures of this example, the resulting pigment in both cases was greenish shade beta copper phthalocyanine having substantially less color strength than the beta modification of the pigment of this example. When another 12 part portion of the purified crude of this comparison was stirred with 96 parts of concentrated sulfuric acid for 2 hours at 70° C., the resulting mixture drowned in 1500 parts of water at 15° C., and the suspension heated to the boil, filtered and washed with water to neutrality, the resulting product was reddish tint alpha copper phthalocyanine pigment having much less color strength and less brilliance than the alpha form of the pigment of this example.

EXAMPLES 2-4

The procedure of Example 1 was repeated except that an equivalent amount of nickel sulfate (Example 2), cobalt chloride (Example 3) or iron chloride (Example 4) was substituted for the cupric oxychloride. Yields of greater than 90% were obtained for the respective nickel, cobalt and iron phthalocyanines.

EXAMPLE 5

A mixture of 150 parts of phthalic anhydride, 295 parts of urea, 45 parts of monosodium-4-chlorophthalate, 1.9 parts of ammonium molybdate and 400 parts of hexachlorobutadiene was heated slowly to 190° C., at which temperature the reaction was completed. Agitation was continued at 190° C. for a total reaction time of 5-6 hours and the resulting melt was dried under vacuum for about 4 hours. The dried product was 270 parts (90% yield) of copper phthalocyanine having a purity of 61%. Purification of the dried product according to the procedure of Example 1 gave 65 parts of a purified crude containing 94% of copper phthalocyanine having 4% organic bonded chlorine. Conventional ball mill grinding of this crude gave the alpha form of the pigment.

EXAMPLE 6

A mixture of 150 parts of phthalic anhydride, 290 parts of urea, 21 parts of monosodium-4-chlorophthalate, 15.5 parts of monosulfonated phthalic acid, 25 parts of cupric oxychloride, 8 parts of aluminum oxide, 1.8 parts of ammonium molybdate and 500 parts of hexachlorobutadiene was heated slowly with agitation to 190° C., at which temperature the reaction was almost completed. Agitation was continued at 190° C. for a total reaction time of 5-6 hours and the resulting melt was dried under vacuum for 4 hours. The dried product was 280 parts (80% yield) of crude having a purity of 50%. When 100 parts of the dried crude were boiled with 500 parts of 5% caustic soda, 44 parts of purified crude containing 91% of copper phthalocyanine having an organic bonded chlorine content of 3.5% and an organic bonded sulfonic acid ($SO_3H$) content of 1.5% were obtained.

EXAMPLE 7

200 Parts of purified crude produced according to the procedure of Example 1 were charged to a vessel containing a melt of 810 parts of anhydrous aluminum chloride and 220 parts of anhydrous sodium chloride at about 120° C. Chlorine was introduced into the charge for about 6 hours at 180° C., following which time the product was recovered as 380 parts of crude copper phthalocyanine green containing 12–16 chlorine atoms and having a purity of about 90%. The chlorinated crude gave an excellent pigment when ground conventionally.

EXAMPLE 8

Into a reaction vessel containing an agitated suspension of 30 parts of anhydrous ferric chloride as catalyst in 450 parts of hexachlorobutadiene at 100° C. were charged 160 parts of purified crude produced according to the procedure of Example 1. Gaseous chlorine was then introduced into the charge and the temperature was raised to 200° C. to complete the chlorination, following which the resulting suspension was drowned in cold water. The hexachlorobutadiene was removed by steam distillation and a crude green chlorinated copper phthalocyanine product was recovered after purification to remove the catalyst. Ball milling gave a good quality pigment.

EXAMPLE 9

A mixture of 150 parts of tetrachlorophthalic anhydride, 195 parts of urea, 17.8 parts of cupric chloride, 1.6 parts of ammonium molybdate and 400 parts of hexachlorobutadiene was heated slowly with agitation to 190° C., at which temperature the reaction was essentially completed. Agitation was continued at 190° C. for a total reaction time of 5–6 hours and the resulting melt was dried under vacuum for 4 hours. The dried product was 250 parts (85% yield) of crude having a purity of 50%. When 200 parts of the crude were purified by boiling with 500 parts of 5% aqueous hydrogen chloride, 110 parts of a purified crude having a phthalogreen content of 90% were obtained.

EXAMPLE 10

A mixture of 150 parts of phthalodinitrile, 40 parts of cupric chloride and 500 parts of hexachlorobutadiene was heated slowly with agitation to 200° C., at which temperature the reaction was completed. Agitation was continued at 200° C. for a total reaction time of 4 hours and the resulting mixture was dried under vacuum for 4 hours. The dried product was 180 parts (90% yield) of crude copper phthalocyanine containing about 6% of bonded chlorine. The crude had a purity of 90%, and a particle size distribution ranging from 0.3–7 microns and was in the gamma modification, a form intermediate that of the alpha and beta modification.

When 12 parts of the above crude were ground with 1.6 parts of sodium dodecyl sulfate, 0.35 part of sodium hydroxide, 0.3 part of sodium dichromate and 3 parts of ethoxyethanol in 120 parts of water at 75° C. for 60 hours and recovered according to the procedure of Example 1, the resulting product was an alpha copper phthalocyanine blue pigment possessing outstanding strength, brilliance and crystallization resistance as compared with the alpha form of the comparative pigment of Example 1 produced using sulfuric acid.

EXAMPLES 11–12

In these examples the procedure of Example 10 was repeated with the exception that 30 parts of cuprous chloride (Example 11) or 32 parts of cupric oxychloride (Example 12) were substituted for the 40 parts of cupric chloride. The crude products of these examples were phthaloblue crudes containing 3 and 1% organic bonded chlorine respectively.

EXAMPLE 13

A mixture of 75 parts of phthalic anhydride, 240 parts of urea, 137 parts of monosodium-4-chlorophthalate, 21 parts of cupric oxychloride, 7.5 parts of aluminum oxide, 89 parts of ammonium sulfate, 1.6 parts of ammonium molybdate and 400 parts of hexachlorobutadiene was heated slowly to 190° C., at which temperature the reaction was completed. Agitation was continued at 190° C. for a total reaction time of 5–6 hours and the product was recovered as in Example 6. The product of this example was 320 parts (87% yield) of crude having a purity of 44%. When the crude was purified according to the procedure of Example 6, 98 parts of purified crude containing 90% of phthaloblue having an organic bonded chlorine content of 13% was obtained.

What we claim and desire to protect by Letters Patent is:

1. In a process for the synthesis of metal phthalocyanines by reacting a phthalodinitrile or a phthalic anhydride and urea with a metal donor in the presence of an organic diluent, the improvement wherein the organic diluent is hexachlorobutadiene.

2. The process of claim 1 wherein the metal phthalocyanine is a copper phthalocyanine.

3. The process of claim 2 wherein the copper phthalocyanine is synthesized by the condensation reaction of a phthalic anhydride, urea and a copper donor in the presence of a catalyst.

4. The process of claim 3 wherein the copper donor is cupric oxychloride.

5. The process of claim 4 wherein the phthalic anhydride is phthalic anhydride.

6. The process of claim 4 wherein the phthalic anhydride is tetrachlorophthalic anhydride.

7. The process of claim 4 wherein the phthalic anhydride is a mixture of phthalic anhydride and monosodium-4-chlorophthalate.

8. The process of claim 4 wherein the phthalic anhydride is a mixture of phthalic anhydride, monosodium-4-chlorophthalate and monosulfonated phthalic acid.

9. The process of claim 2 wherein the copper phthalocyanine is synthesized by the condensation reaction of a phthalodinitrile and a chloride of copper.

* * * * *